(Model.)

A. A. KELLOGG.
STALK CUTTER.

No. 254,334. Patented Feb. 28, 1882.

WITNESSES:
Francis McArdle
C. Sedgwick

INVENTOR:
A. A. Kellogg
BY Munn & Co
ATTORNEYS.

UNITED STATES PATENT OFFICE.

ALBERT A. KELLOGG, OF CHAMOIS, MISSOURI.

STALK-CUTTER.

SPECIFICATION forming part of Letters Patent No. 254,334, dated February 28, 1882.

Application filed December 16, 1881. (Model.)

*To all whom it may concern:*

Be it known that I, ALBERT A. KELLOGG, of Chamois, Osage county, Missouri, have invented a new and useful Improvement in Stalk-Cutters, of which the following is a full, clear, and exact description.

Reference is to be had to the accompanying drawings, forming part of this specification, in which similar letters of reference indicate corresponding parts in both figures.

Figure 1:
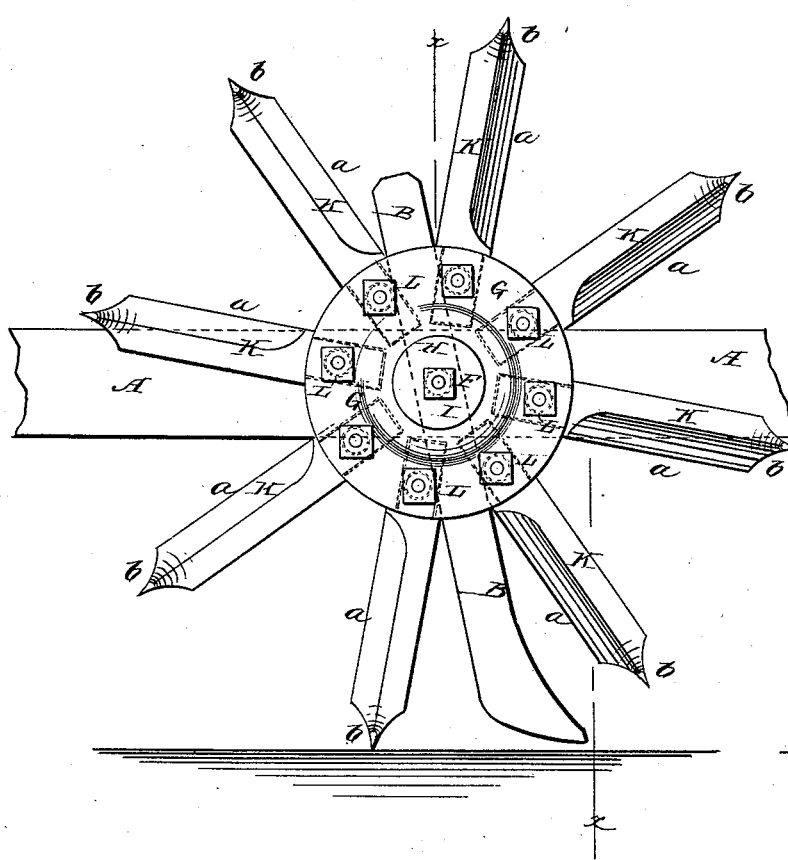
Figure 2:
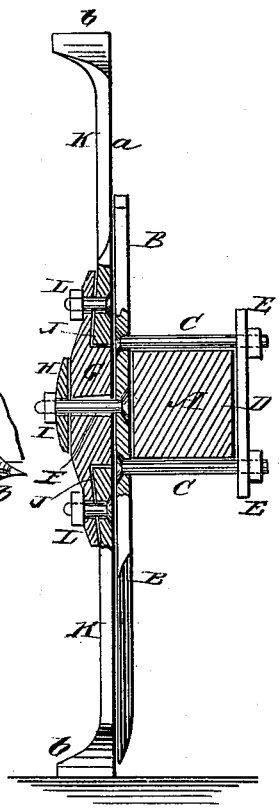

Figure 1 is a side elevation of my improvement, and Fig. 2 is a sectional front elevation of the same, taken through the line $x$ $x$, Fig. 1.

This invention is intended for attachment to plow-beams, in front of the plow, and has for its object to facilitate the cutting of stalks and other rubbish that come before the plow during the use thereof.

The invention consists in combining a vertically-rotating wheel, carrying a series of cutting or knife arms, with the ordinary colter, in such a manner that as the plow advances the wheel will be turned by the contact of its arms with the ground, and the stalks or rubbish that collect in front of the colter will be severed by the knives of the wheel as they successively pass the colter.

The invention further consists in certain details of construction, all of which I will now proceed fully to describe.

A represents a plow-beam, and B is a colter, which is secured to the beam A by two bolts, C, placed the one above and the other below the beam A. The bolts C pass through the colter B, and through a bar or yoke, D, placed upon the opposite side of the beam A from the colter B, and have nuts E screwed upon their forward ends. The heads of the bolts C are countersunk in the colter B, so that the outer surface of the said heads will be flush with the outer surface of the said colter, as shown in Fig. 2.

F is a bolt which passes through the colter B, midway between the bolts C, and the head of which is countersunk in the inner side of the said colter, as shown in Fig. 2. Upon the bolt or spindle F is placed a hub, G, which is secured in place by a washer, H, and a nut, I, so that the hub G will be free to revolve upon the spindle F. The bore of the hub G is made larger than the spindle F, to allow the said hub to have a free play upon the said spindle.

In the inner side of the hub G are formed a number of radial recesses or sockets, J, into which are fitted the shanks of the radial knives or cutters K, which are secured in place by bolts L, passing through them and through the hub G. The heads of the bolts L are countersunk in the shanks of the knives K, so that their outer surfaces will be flush with the surfaces of the said knives K, and the knives K are so formed that their outer surfaces will be flush with the surface of the hub G, so that the knives K and the hub G can work close to the colter B.

The outer ends, $b$, of the knives K are made wide, as shown in Fig. 2, and are tapered to an edge, as shown in Fig. 1, so that they will enter and take a firm hold upon the ground, and thus rotate the hub G, causing the successive knives K, in connection with the colter B, to operate as shears to cut any stalks or rubbish that may be encountered as the plow is drawn forward.

I have described the cutter as being attached to a plow-beam; but the plow may be omitted, and a number of beams, A, with their cutters, can be attached to a frame, thus forming a stalk-cutting machine which will thoroughly cut stalks and rubbish that may be spread over the land.

Having thus described my invention, I claim as new and desire to secure by Letters Patent—

1. In a stalk-cutter, the plow-beam A, colter K, and cutter-carrying hub G, combined with and held together by a pivot, I, made to hold the cutter K fast to the beam and to allow the hub to turn on it, as shown and described.

2. The combination, with the plow-beam, of a fixed front-sharpened colter, B, and rear-sharpened cutters K, the latter extending beyond the former, arranged radially in a hub, G, attached, with the colter, to the side of plow-beam, as shown and described.

ALBERT A. KELLOGG.

Witnesses:
W. C. SEBRING,
HENRY MARQUAND.